US007238066B2

(12) United States Patent
Taylor et al.

(10) Patent No.: US 7,238,066 B2
(45) Date of Patent: Jul. 3, 2007

(54) POD PROPULSION SYSTEM WITH RIM-MOUNTED BEARINGS

(75) Inventors: Douglas Lee Taylor, Yorktown, VA (US); David Albert Gooding, Newport News, VA (US); Sean Allen Coons, Suffolk, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 203 days.

(21) Appl. No.: 10/948,061

(22) Filed: Sep. 23, 2004

(65) Prior Publication Data

US 2006/0063442 A1   Mar. 23, 2006

(51) Int. Cl.
  *B63H 11/00*   (2006.01)
(52) U.S. Cl. .............................. 440/38; 440/6; 440/83; 114/151
(58) Field of Classification Search ................ 440/6, 440/38, 83; 114/151, 230.12; 384/117, 122
See application file for complete search history.

(56) References Cited

U.S. PATENT DOCUMENTS

| | | | |
|---|---|---|---|
| 3,351,394 A * | 11/1967 | Hooker ........................ | 384/117 |
| 3,487,805 A | 1/1970 | Satterthwaite et al. | |
| 4,343,611 A | 8/1982 | Scott-Scott | |
| 4,753,553 A * | 6/1988 | Carlsen et al. ........... | 405/195.1 |
| 5,205,653 A * | 4/1993 | Veronesi et al. ............ | 384/306 |
| 5,306,183 A | 4/1994 | Holt et al. | |
| 5,383,802 A * | 1/1995 | Nicholson .................... | 440/38 |
| 5,634,725 A * | 6/1997 | Chester ....................... | 384/117 |
| 5,740,766 A | 4/1998 | Moser | |
| 6,837,757 B2 * | 1/2005 | Van Dine et al. ................ | 440/6 |
| 2003/0186601 A1 | 10/2003 | Collier et al. | |

OTHER PUBLICATIONS

"Scale Model Testing of a Commercial Rim-Driven Propulsor Pod", Lea et al., 12 pgs., downloaded from unknown internet site, Oct. 2003.
"The Commercial Rim-Driven Permanent Magnet Motor Propulsor Pod", Van Blarcom et al., Aug. 22, 2002, 13 pgs.
"The Commercial Rim-Driven Permanent Magnet Motor Propulsor Pod", Van Blarcom, http://www.nsrp.org/st2003/presentations/vanblarcom.pdf, Shipbuilding Technologies 2003 Conference, Jan. 16-17, 2003, 5 pgs.
"Pod Propulsion", http://www.hsva.de/service/res/pod.html#pub, Jan. 13, 2003, 4 pgs.

\* cited by examiner

*Primary Examiner*—Ed Swinehart
(74) *Attorney, Agent, or Firm*—Hunton & Williams LLP

(57) ABSTRACT

A pod propulsion system comprises a housing defining a fluid duct and an annular drum rotatably mounted to the housing within the fluid duct. The annular drum has a drum interior and a cylindrical outer surface. The system further comprises a rotor mounted to the drum for rotation therewith, the rotor and the drum having a common axis of rotation. A bearing assembly mounted to the housing comprises a first bearing comprising a first plurality of bearing pads disposed circumferentially around the drum. Each pad has a pad bearing surface adapted to contact a first drum portion in a predetermined manner and is pivotably mounted to the housing so as to maintain contact of the pad bearing surface with the first drum portion in the predetermined manner when an orientation of the drum portion relative to the housing changes.

12 Claims, 15 Drawing Sheets

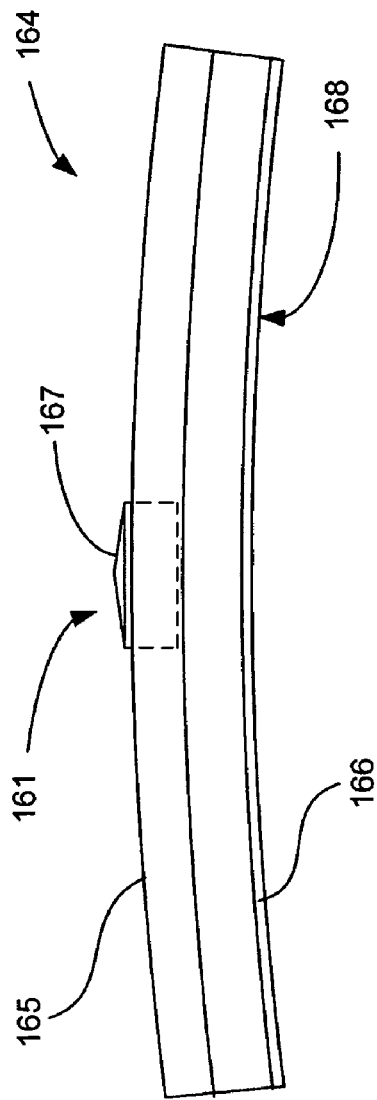
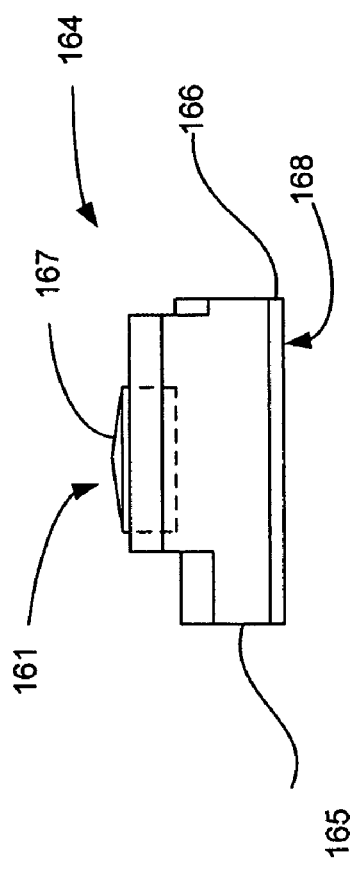

POD PROPULSION SYSTEM WITH RIM-MOUNTED BEARINGS

BACKGROUND OF THE INVENTION

The present invention relates generally to maritime propulsion systems and, more particularly, to pod propulsion systems and bearing arrangements therefor.

In recent years, pod propulsion systems have gained widespread use in large vessels such as cruise ships, ferries and cargo ships. These systems can generally provide high efficiency and maneuverability with lower noise generation than traditional shaft-driven rotor systems. They also provide a high degree of layout flexibility because of the relative independence of their location relative to the primary power plant of the vessel.

Propulsion pods are relatively self-contained units that can be suspended beneath a ship's hull and independently azimuthly rotated. As shown in FIG. 1, a typical propulsion pod 10 includes one or more rotors 20 arranged within a duct or shroud 30. The rotors 20 are rotatably mounted to a shaft 40 that is centered within the duct 30 by one or more fixed support structures 50. Friction between the rotors 20 and the shaft 40 is reduced by a series of bearing assemblies 52 mounted to the support structures 50. The shaft 40 and rotors 20 may be driven by an internal electric motor or by a shaft-based drive mechanism. In some examples, the rotors 20 are surrounded by a rotating rim or drum that can be driven by a drive mechanism mounted to the housing.

Historically, the propulsion pods described above have encountered significant maintenance and reliability problems including performance degradation and outright failure of the shaft bearing system. Some of these problems are due, at least in part, to the difficulty in maintaining the correct hydrodynamic balance between the shaft, the pod housing/duct and the rotor as flow conditions and rotation speed change. The typical shaft-based pod configuration also results in inherent problems in routing and maintaining lubrication to the shaft bearing system.

SUMMARY OF THE INVENTION

The present invention provides pod propulsion systems that use a rim-mounted bearing system rather than a hub mounted system with a shaft and fixed supports to mount the rotor(s). In an illustrative embodiment of the invention, a pod propulsion system comprises a housing defining a fluid duct and an annular drum rotatably mounted to the housing within the fluid duct. The annular drum has a drum interior and a cylindrical outer surface. The system further comprises a rotor mounted to the drum for rotation therewith, the rotor and the drum having a common axis of rotation. A bearing assembly mounted to the housing comprises a first bearing comprising a first plurality of bearing pads disposed circumferentially around the drum. Each pad has a pad bearing surface adapted to contact a first drum portion in a predetermined manner and is pivotably mounted to the housing so as to maintain contact of the pad bearing surface with the first drum portion in the predetermined manner when an orientation of the drum portion relative to the housing changes.

Objects and advantages of the invention will be apparent to one of ordinary skill in the art upon reviewing the detailed description of the invention.

BRIEF DESCRIPTION OF THE DRAWINGS

FIG. 5b is a side view of the bearing pad of FIG. 5a;

FIG. 5c is an end view of the bearing pad of FIG. 5a;

FIG. 6b is a plan view of the bearing pad of FIG. 6a;

FIG. 12b is a side view of the bearing pad of FIG. 12a;

FIG. 12c is a section view of the bearing pad of FIG. 12a;

FIG. 13b is a section view of the bearing pad of FIG. 13a;

DETAILED DESCRIPTION OF THE INVENTION

Figure 1:
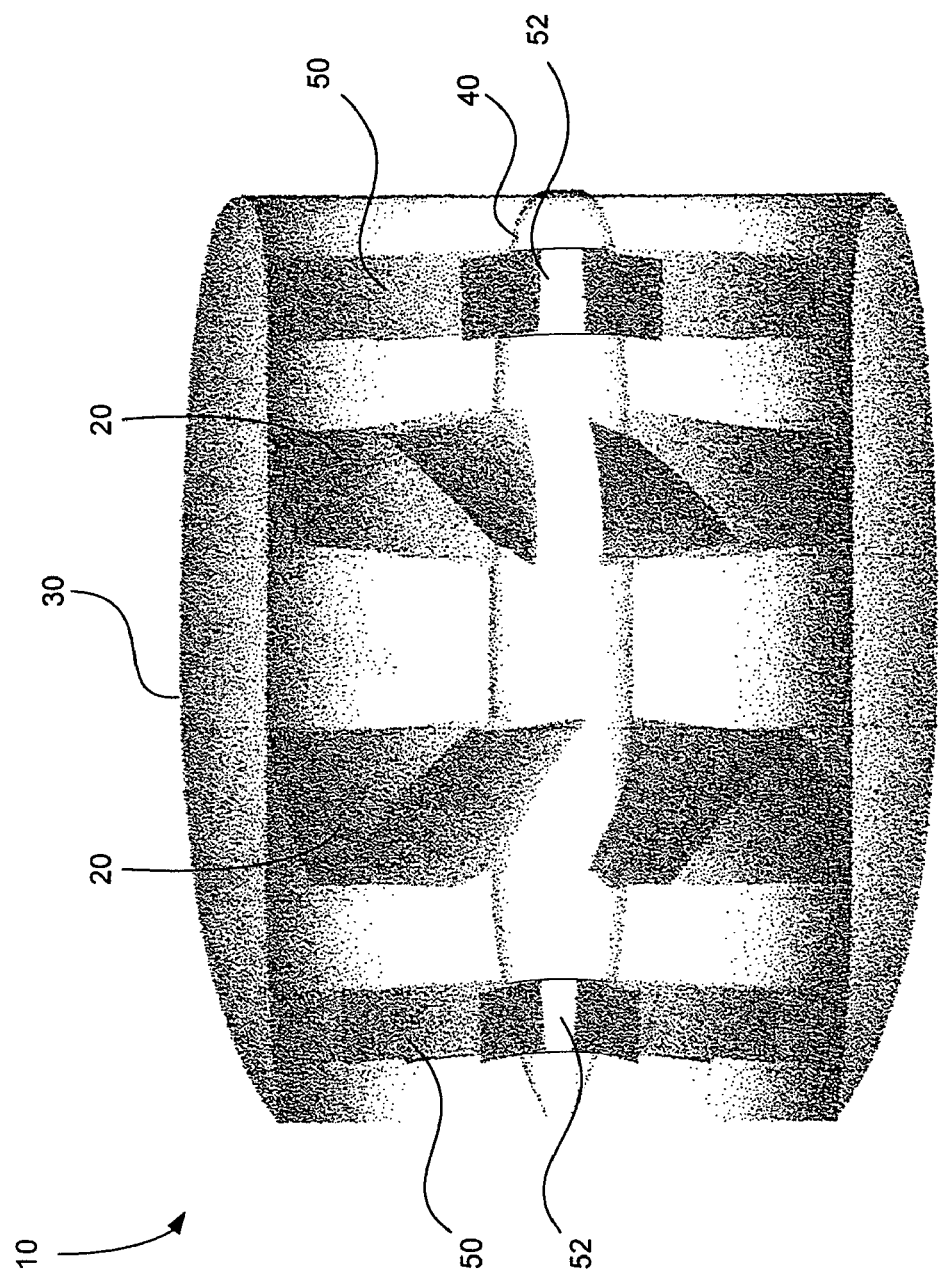
FIG. 1 is a cutaway illustration of a prior art propulsion pod.
Figure 2:
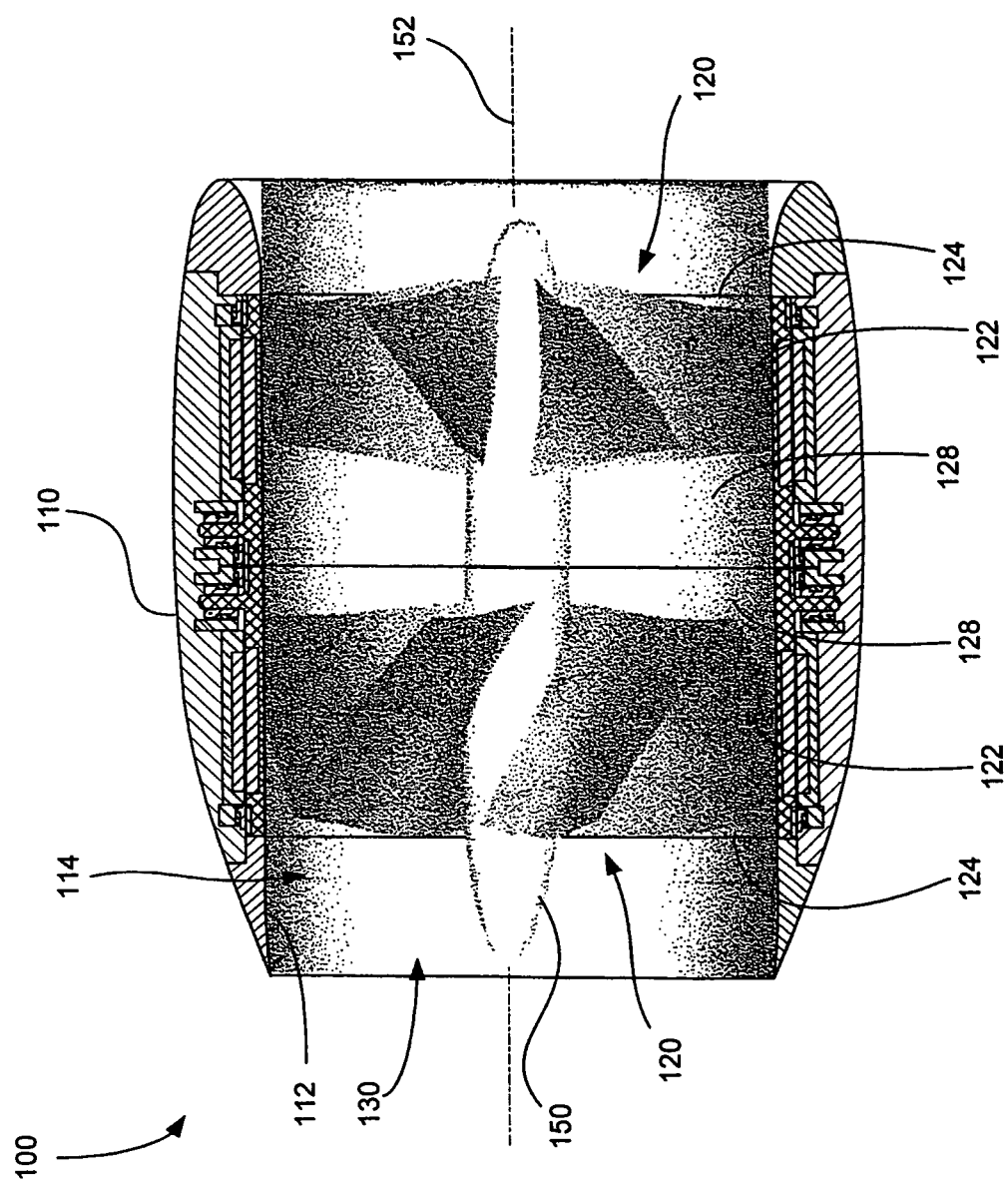
FIG. 2 is a cutaway illustration of a propulsion pod system according to an embodiment of the invention.
Figure 3:
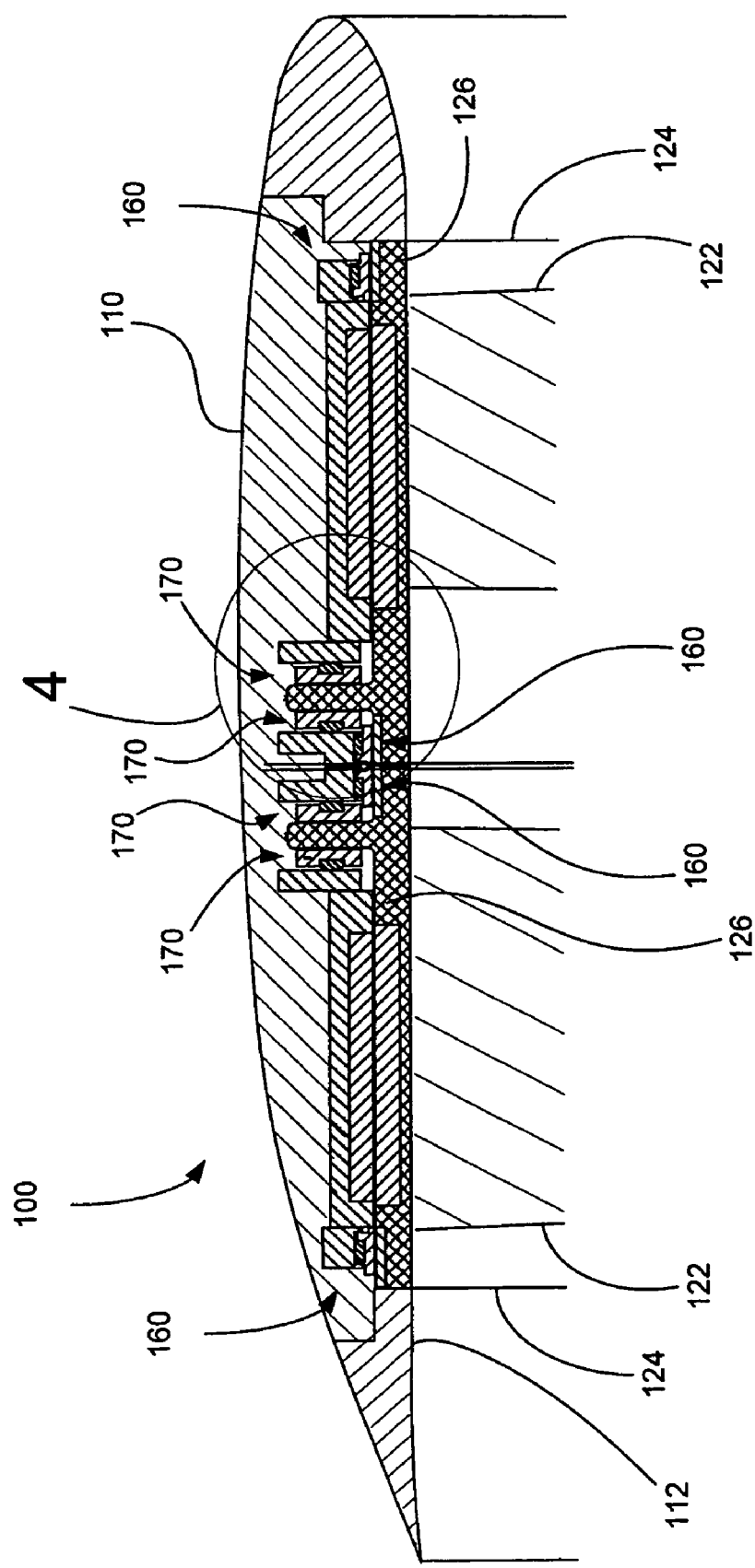
FIG. 3 is a section view of a portion of the propulsion pod system of FIG. 2.

The present invention provides pod propulsion systems that use a rim-mounted bearing system rather than a shaft and fixed supports to mount the rotor(s). As used herein, the term rim-mounted refers to the fact that the bearings are mounted to a fixed structure outside the periphery of the rotating elements of the propulsion system. FIGS. 2 and 3 illustrate an exemplary pod propulsion system 100 using rim-mounted bearings according to an embodiment of the invention. The pod propulsion system 100 has a shroud or housing 110 having an inner wall 112 defining an interior space 114. The system 100 also has a pair of rotor units 120 disposed within the interior space 114, each comprising a rotor 122 attached within the interior of a rotating drum 124. It will be understood that while the exemplary embodiment has two rotor units 120, pod propulsion systems according to the invention may have only a single rotor unit or may have more than two rotor units 120. The rotors 122 may be attached to a common shaft 150 so that the rotors 122 and drums 124 rotate together about a common axis 152. Alternatively, the rotors 122 may be mounted to separate collinear shafts so that the two drums 124 may rotate separately about their common axis 152. In such embodiments, the rotor units 120 may be adapted to rotate at different speeds or to counter-rotate relative to one another. In another alternative embodiment, the two drums 124 may be combined into a single drum 124 in which both rotors 122 are mounted. This embodiment may be advantageous in some applications because it may allow the number of bearing assemblies to be reduced.

Figure 4:
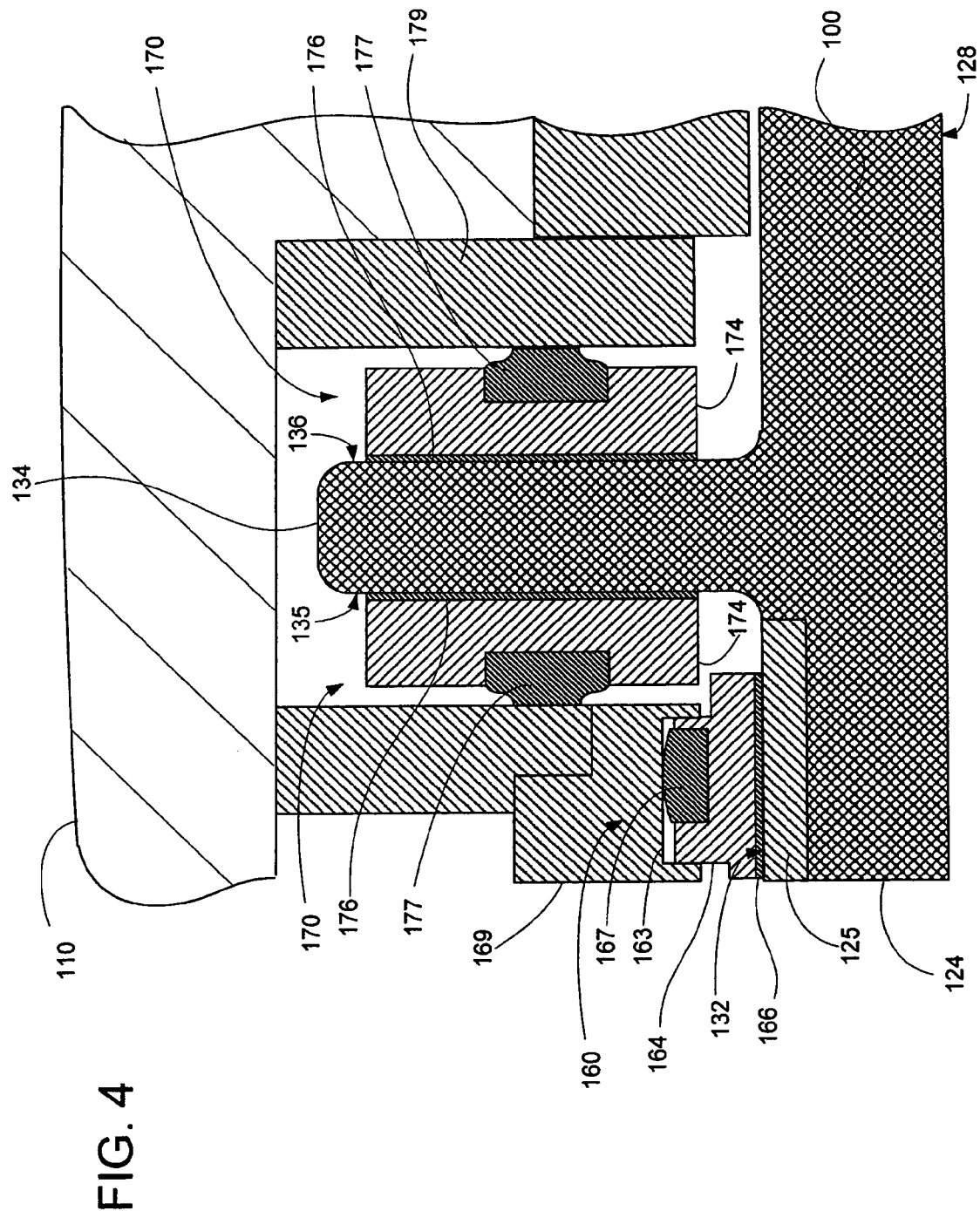
FIG. 4 is a section view of a portion of the propulsion pod system of FIG. 2.
Figure 5A:
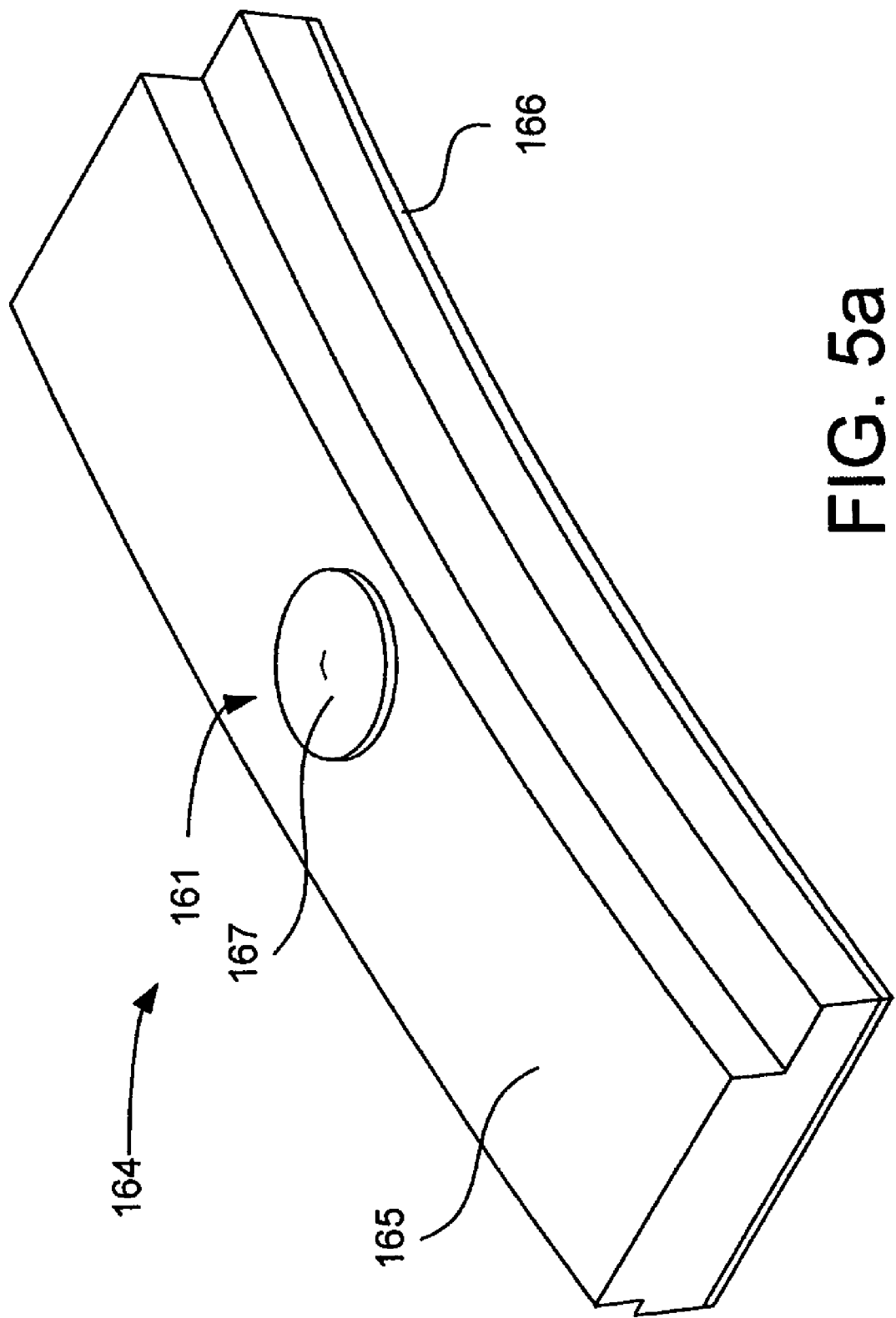
FIG. 5a is a perspective view of a bearing pad that may be used in embodiments of the invention.
Figure 6B:
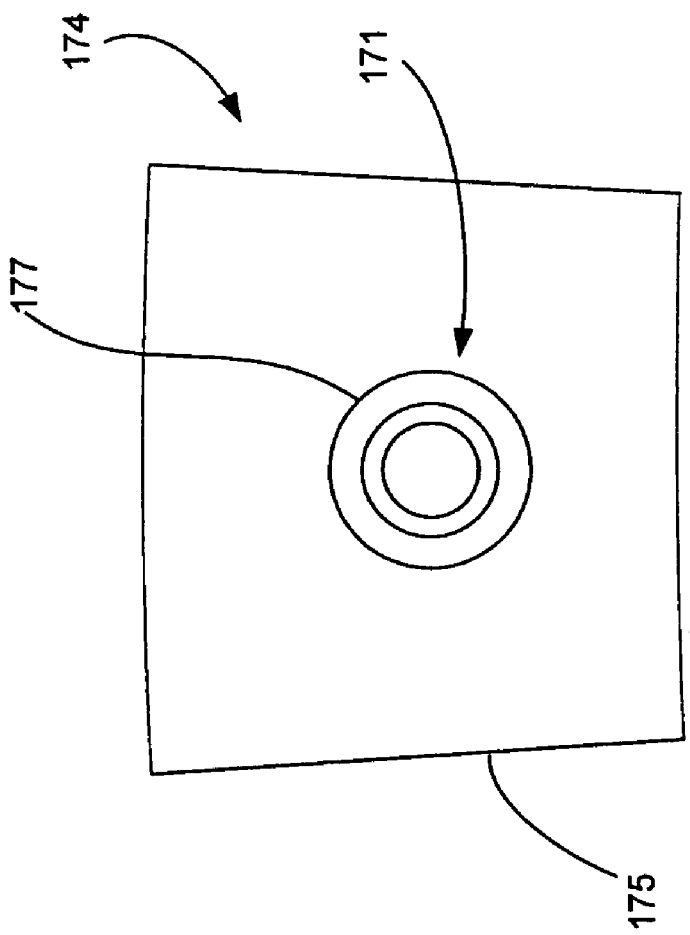
Figure 6A:
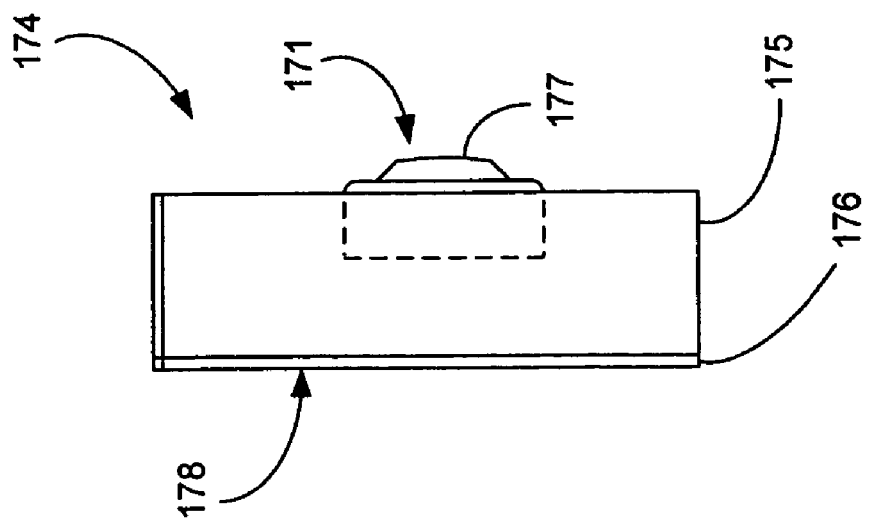
FIG. 6a is a side view of a bearing pad that may be used in embodiments of the invention.
Figure 7:
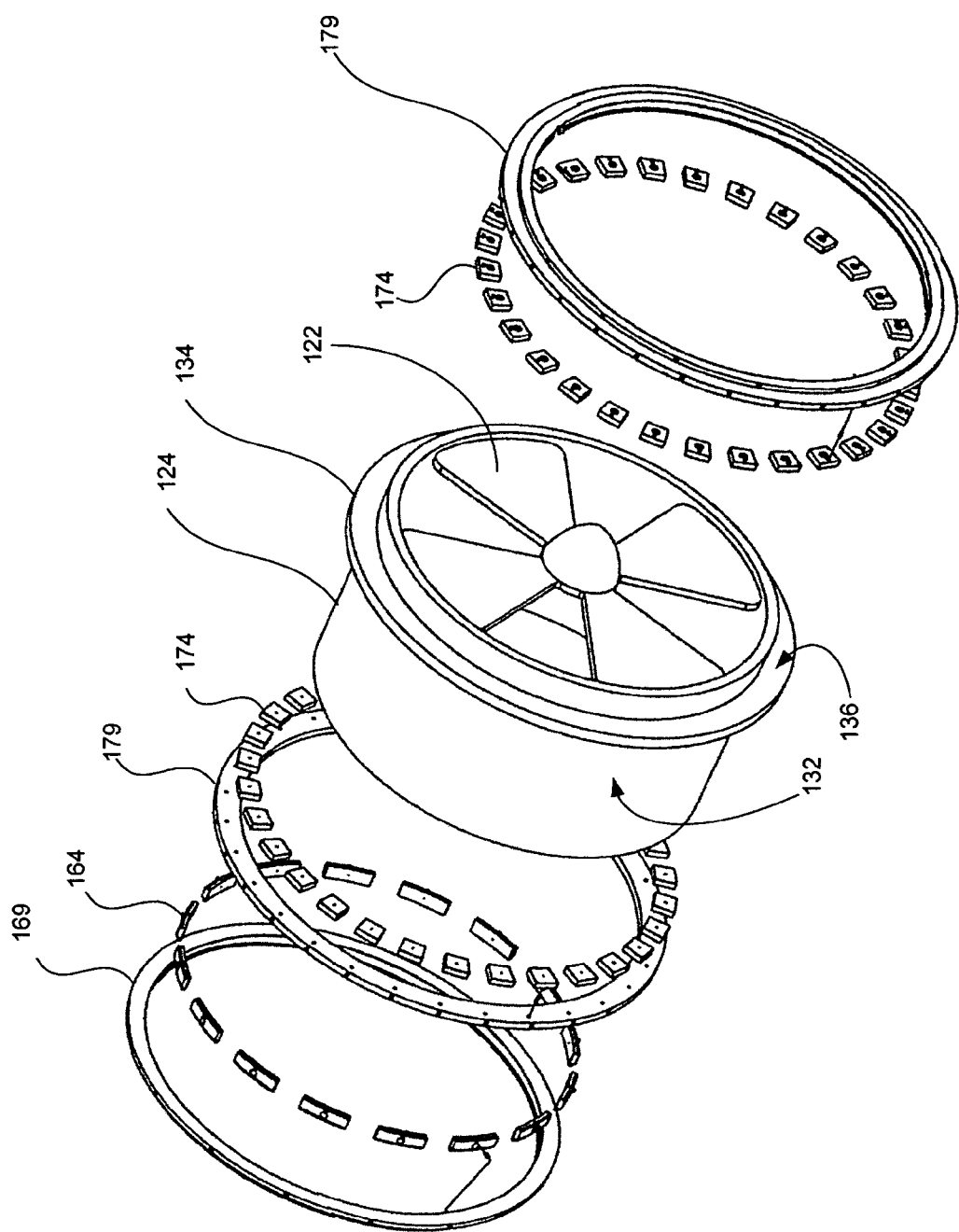
FIG. 7 is an exploded view of a portion of a pod propulsion system according to an embodiment of the invention.

Each drum 124 is formed with a cylindrical wall 126 having an inner drum surface 128 and an outer drum surface 132 as shown in FIGS. 3 and 4. The inner drum surface 128 and the forward and rear portions of the housing inner wall 112 combine to define a fluid duct 130 through which a fluid may be drawn by the rotation of the rotor units 120. The drum 124 is rotatably positioned and held in place within the housing 110 by a series of tilting pad bearing assemblies. These bearing assemblies are configured and positioned to support the drum 124 and carry the radial reaction loads (i.e., reaction loads that are approximately orthogonal to the rotation axis 152) and thrust reaction loads (i.e., reaction loads that are approximately parallel to the rotation axis 152). As shown in FIG. 3, each drum 124 of the pod propulsion system 100 is supported by two journal bearing assemblies 160 and two thrust bearing assemblies 170. With reference to FIG. 4, the journal bearing assemblies 160 each comprise a plurality of journal bearing pads 164 that are adapted to maintain bearing contact with the outer drum surface 132, thereby imparting radial reaction loads thereto. The two journal bearing assemblies 160 are positioned adjacent the forward and rearward ends of the drums 124 in order to evenly distribute reaction loads. It will be understood by those of ordinary skill in the art that in some embodiments, a single journal bearing assembly 160 may be used and that in other embodiments, more than two journal bearing assemblies 160 may be used. The drum 124 comprises a journal bearing contact portion 125 that defines at least a portion of the outer drum surface 132. The journal bearing contact portion 125 may be formed from a different material from the remainder of the drum 124. It will be understood by those of ordinary skill in the art that the contact portion may be formed from any suitable metallic or non-metallic bearing material which may be selected based on the system operating environment and operating parameters. The journal bearing contact portion 125 may be integrally formed with the remainder of the drum or may be attached, formed on or adhered thereto.

The thrust bearing assemblies 170 each comprise a plurality of thrust bearing pads 174 adapted to maintain bearing contact with a collar 134 formed on or attached to the outer drum surface 132 and extending radially outward therefrom. In the illustrated embodiment, two thrust bearing assemblies 170 are positioned on opposite surfaces 135, 136 of the collar 134 so that thrust reaction loads are provided in both the forward direction and the rearward direction. It will be understood by those of ordinary skill in the art that the drum 124 may incorporate additional collars 134. In such instances, additional thrust bearing assemblies 170 may be included. In some embodiments of the invention, a first thrust bearing assembly 170 may be positioned and adapted for bearing contact with a first collar 134 so as to provide forward thrust reaction and a second thrust bearing assembly 170 may be positioned and adapted for bearing contact with a second collar 134 so as to provide rearward thrust reaction.

As used herein, the term "bearing contact" is intended to encompass both those instances where there is direct surface-to-surface contact between two bodies and those instances where a fluid under pressure is interposed between the surfaces of two bodies such that reaction forces may still be transmitted therebetween. Such a fluid may be a lubricant or may simply be the working fluid being passed through the propulsion system.

With reference to FIGS. 4-7, the bearing assemblies 160, 170 will now be discussed in more detail. The journal bearing pads 164 may comprise a tilting pad block 165 having a bearing contact portion 166 with a curved bearing surface 168 that is shaped to conform to the drum surface 132. The material used to form the pad block 165 is typically a metallic material selected based on the system performance requirements and the operational environment. Such materials may include but are not limited to nickel, copper, aluminum and alloys such as INCONEL. The bearing contact portion 166 may be integrally formed with the journal bearing pad block 165 or may be a separate material deposited, attached or adhered to the pad block 165. The bearing contact portion 166 may be formed from a metallic or non-metallic material selected based on the system operating environment and operating parameters. Such materials may include but are not limited to Nickel, Aluminum, Bronze, Polyimide or Polyamide non-metallics (e.g., VESPEL, PEEK, THORDON), ultra-high molecular weight polyethylene (UHMWP), TEFLON composite or graphic composite materials. The journal bearing pads 164 may also comprise a pivot arrangement 161 that serves to provide a fulcrum for the tilting pad block 165 to rock or rotate about a pivot. The pivot arrangement 161 is adapted to bear against a portion of the fixed support structure to allow the pad block 165 to rotate to maintain a desired bearing contact orientation with respect to the drum surface 132 when the drum surface changes its orientation relative to the structure supporting the pad block 165. In the illustrated embodiment, the fulcrum is provided by a button 167 partially inserted into the pad block 165. In some embodiments, the pivot arrangement 161 may comprise a fulcrum structure integrally formed with or machined into the pad block 165. The pivot arrangement 161 may comprise a point, line, spherical or other fulcrum arrangement known in the art to allow the adaptive orientation of the journal pad block 165. The pivot arrangement used in a given application may be determined based on the degree of change in drum surface orientation expected during operation.

The journal bearing pads 164 may be held in bearing contact with the drum surface 132 by a journal bearing retaining ring 169. The journal bearing ring 169 may have a retaining groove 163 configured for receiving the journal pad blocks 165. The groove 163 may be further adapted to provide a support surface for the pivot arrangement 161 and to allow for the rotational movement of the journal block pads 165 to adapt to changes in orientation of the drum surface 132. The journal bearing retaining ring 169 is configured to be retained in place by the fixed structure of the housing 110.

It will be understood that each journal bearing assembly 160 may comprise any number of journal pad blocks 165 around the circumference of the drum 124. The desired pad surface area is generally determined by the operating environment and desired performance. For a given pad surface area, the size and number of the journal pad blocks 165 may be determined by the expected degree of misalignment of the rotation axis 152 or change in orientation of the drum surface 132 during operation. The greater the number of journal pad blocks 165, the more flexible and adaptable the bearing assembly 160 will be.

The thrust bearing pads 174 may also comprise a tilting pad block 175 (FIGS. 6a and 6b) having a bearing contact portion 176 with a bearing surface 178 that is shaped to conform to the surfaces 135, 136 of the collar 134. Typically, the collar surfaces 135, 136 and the thrust pad bearing surface 178 will be substantially planar and oriented perpendicular to the axis of rotation 152. In such embodiments, the forward and rearward-facing thrust bearing pads may be substantially identical. It will be understood, however, that in some embodiments the forward and rearward collar surfaces 135, 136 may be non-planar or may be oriented at a different angle and may differ from one another. In such embodiments, the bearing surface 178 and/or the orientation of the forward and rearward facing thrust pads 174 may differ in a corresponding manner.

The bearing contact portion 176 of the thrust bearing pad block 175 may be integrally formed with the thrust bearing pad block 175 or may be a separate material deposited, mechanically attached or adhered to the pad block 175. The bearing contact portion 176 may be metallic or non-metallic and is selected based on the system operating environment and operating parameters. The thrust bearing pads 174 may also comprise a pivot arrangement 171 that serves to provide a fulcrum for the tilting pad block 175. The pad block 175 is typically formed from a metallic material selected based on the system performance requirements and the operational environment. As with the journal bearing pivot arrangement 161, the thrust bearing pivot arrangement 171 is adapted to bear against a portion of the fixed support structure to allow the thrust bearing pad block 175 to rotate to maintain a desired bearing contact orientation with respect to the collar surfaces 135, 136 when the collar changes its orientation relative to the structure supporting the pad block 175. In the illustrated embodiment, the fulcrum is provided by a button 177 partially inserted into the pad block 175. In some embodiments, the pivot arrangement 171 may comprise a fulcrum structure integrally formed with or machined into the pad block 175. The pivot arrangement 171 may comprise a point, line, spherical or other fulcrum arrangement known in the art to allow the adaptive orientation of the thrust pad block 175. The pivot arrangement used in a given application may be determined based on the degree of change in collar surface orientation expected during operation.

The thrust bearing pads 174 may be held in bearing contact with the collar 134 by a pair of thrust bearing retaining rings 179, one for the forward thrust bearing pads 174 and one for the rearward thrust bearing pads 174. The thrust bearing rings 179 are adapted to provide a support surface for the pivot arrangement 171 and to allow for the rotational movement of the journal block pads 175 to adapt to change in orientation of the collar 134. The thrust bearing retaining rings 179 are configured to be retained in place by the fixed structure of the housing 110.

It will be understood that each thrust bearing assembly 170 may comprise any number of thrust pad blocks 175 around the circumference of the drum 124. As with the journal pads, the desired pad surface area may be determined by the operating environment and desired bearing performance. For a given pad surface area, the size and number of the thrust pad blocks 175 may be determined by, among other things, the expected degree of misalignment of the rotation axis 152 or change in orientation of the drum surface 132 during operation. Thrust pad block design considerations may include pod propulsion unit size and manufacturing tolerances, pod structure stiffness and expected structural deflections, bearing loading (based on operational pressure and speeds), bearing size and materials used.

It will also be understood that a single ring structure could be used as both a journal bearing retaining ring and a thrust bearing retaining ring. This structure could be a single integrally formed ring or an assembly formed from the journal bearing retaining ring 169 and the thrust bearing retaining ring 179.

Figure 8:
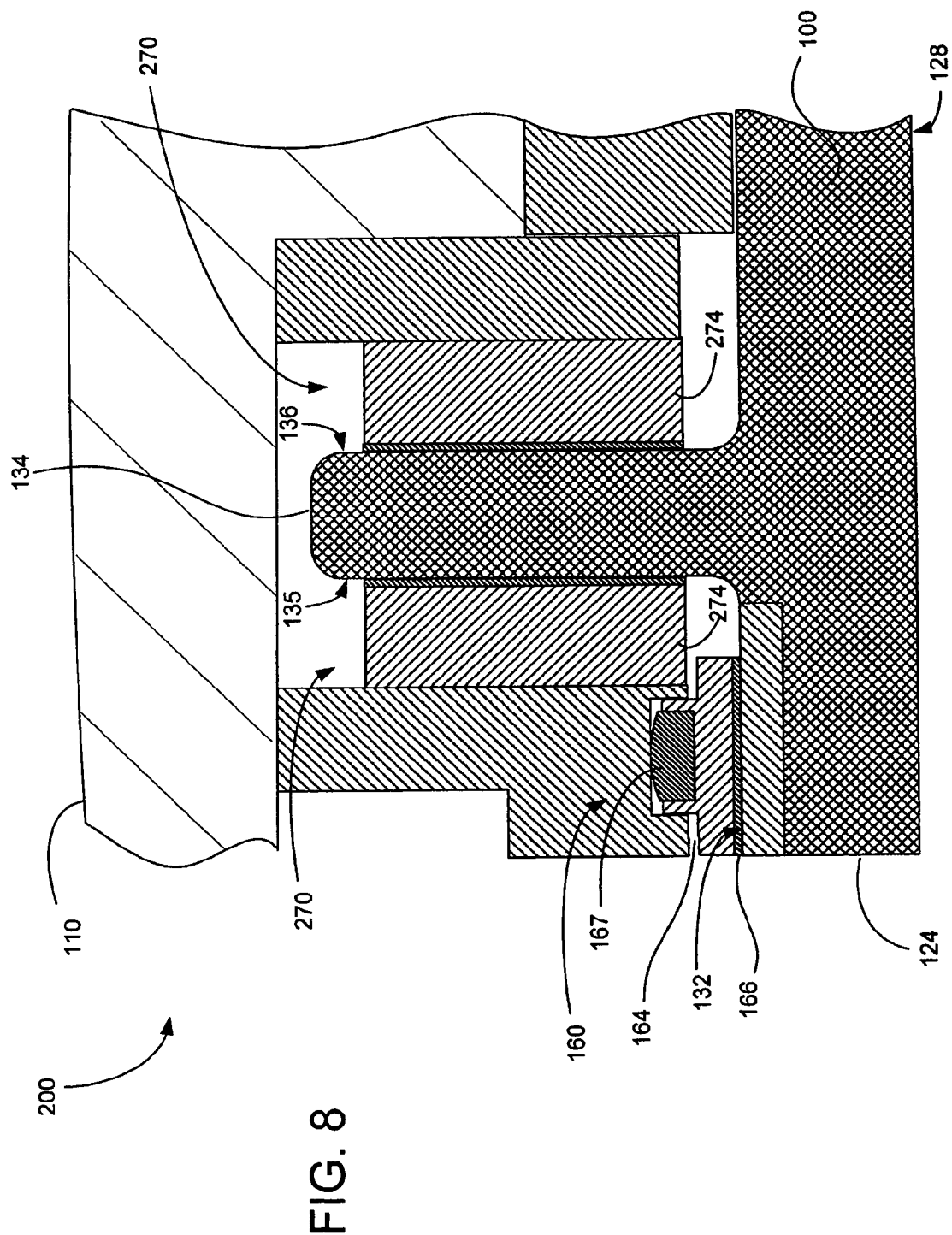
FIG. 8 is a section view of a portion of a propulsion pod system according to an embodiment of the invention.

The assembled bearings shown in FIGS. 4 and 8 provide a uniquely adaptive rim-mounted bearing system. In typical pod propulsion systems, the tilting pad thrust and journal bearings provide the capability to accommodate all of the misalignments due to manufacturing tolerances, deflections influenced by thermal and/or pressure conditions and bearing clearances. This serves to provide a significant improvement in performance and bearing life.

Figure 9:
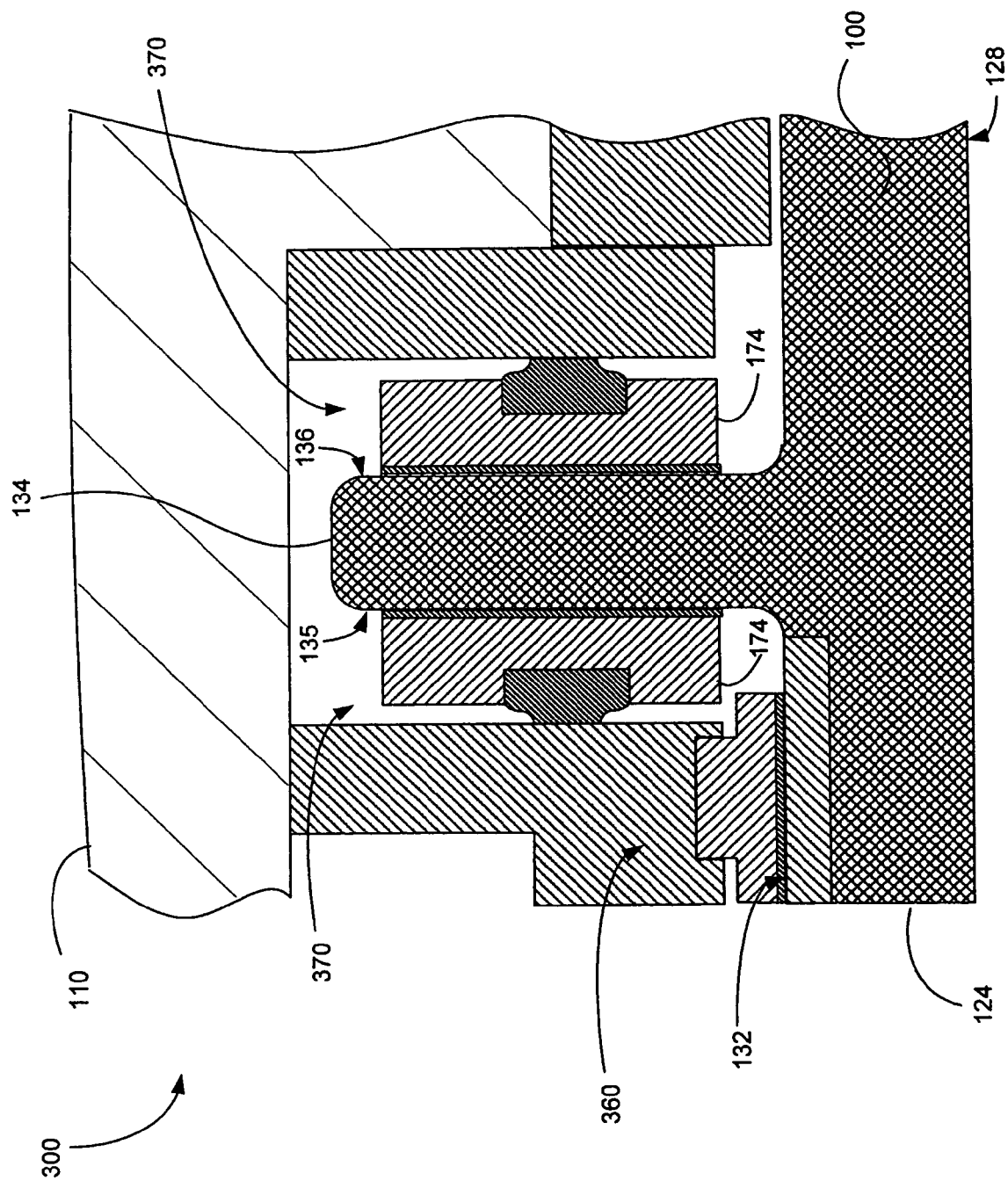
FIG. 9 is a section view of a portion of a propulsion pod system according to an embodiment of the invention.
Figure 10:
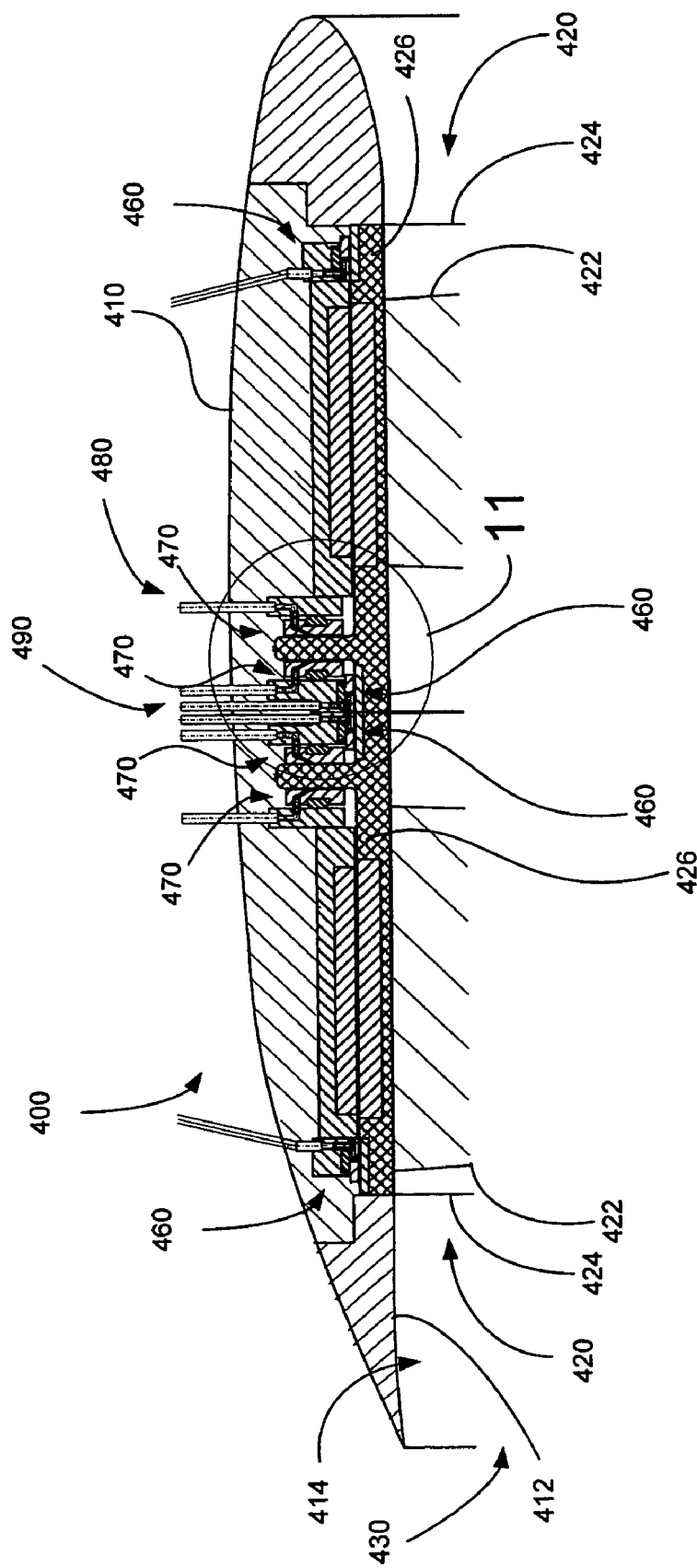
FIG. 10 is a section view of a portion of a propulsion pod system according to an embodiment of the invention.

In the above-described pod propulsion system, all of the bearing assemblies use tilting pads to maintain optimum bearing contact with the drum 132. It will be understood by those of ordinary skill in the art, however, that a combination of rim-mounted tilting pad and rim-mounted conventional pad bearing assemblies may also be used. For example, FIG. 8 illustrates a portion of a pod propulsion system 200 having an identical housing 110 and rotor unit 120 to the earlier described pod propulsion system 100. The propulsion system 200 of FIG. 8 uses a tilting pad journal bearing assembly 160 that is substantially similar to that of the previously described embodiment. The thrust bearing assemblies 270, however, comprise conventional, non-tilting thrust bearing pads 274. Similarly, FIG. 9 illustrates a portion of a pod propulsion system 300 having an identical housing 110 and rotor unit 120 to the earlier described pod propulsion system 100. The propulsion system 300 comprises a conventional non-tilting pad journal bearing assembly 360 and tilting pad thrust bearing assemblies 370 that are similar to those of the earlier described system 100.

It will be understood that all of the embodiments described above may be configured for hydrostatic and non-hydrostatic operation. As discussed in more detail below, hydrostatic thrust and journal bearing systems will include fluid connectors that allow fluid to be ported through the bearing pad assemblies to the journal or thrust running surfaces. Fluid flow through the pad assemblies will provide a fluid wedge between the bearing assemblies and the applicable running surfaces. This fluid wedge allows for easier system start-ups, minimizes bearing wear during slow speed operations and also when operating in a contaminated environment. Both hydrostatic and non-hydrostatic systems may also be adapted to take full advantage of hydrodynamic friction reduction.

Because the bearings of the propulsion systems of the invention are mounted external to the rotating components of the system, they are readily accessible and can be easily reached by electrical and hydraulic lines. This facilitates the additional improvement of using hydrostatic bearings. With reference to FIGS. 10-13, a pod propulsion system 400 has a construction similar to those described above, except as discussed herein. The pod propulsion system comprises a shroud or housing 410 having an inner wall 412 defining an interior space. The system 400 also has a pair of rotor units 420 disposed within the interior space 414, each comprising a rotor 422 attached within the interior of a rotating drum 424. It will be understood that while the exemplary embodiment has two rotor units 420, pod propulsion systems according to the invention may have only a single rotor unit 420 or may have more than two rotor units 420. The rotors 422 are attached to a common shaft so that the rotors 422 and drums 424 rotate together about a common axis. Each drum 424 is formed with a cylindrical wall 426 having an inner drum surface 428 and an outer drum surface 432. The inner drum surface 428 and the forward and rear portions of the housing wall 412 combine to define a fluid duct 430 through which a fluid may be drawn by the rotation of the rotor units 420.

Each drum 424 is rotatably positioned and held in place within the housing 410 by a series of tilting pad bearing assemblies. These bearing assemblies are configured and positioned to support the drum 424 and provide radial reaction loads and thrust reaction loads. Each drum 424 of the pod propulsion system 400 is supported by two journal bearing assemblies 460 and two thrust bearing assemblies 470. The journal bearing assemblies 460 each comprise a plurality of journal bearing pads 464 that are adapted to maintain bearing contact with the outer drum surface 432, thereby imparting radial reaction loads thereto. The two journal bearing assemblies 460 are positioned adjacent the forward and rearward ends of the drums 424 in order to evenly to distribute reaction loads. It will be understood by those of ordinary skill in the art that in some embodiments, a single journal bearing assembly 460 may be used and that in other embodiments, more than two journal bearing assemblies 460 may be used. The drum 424 comprises a journal bearing contact portion 425 that defines at least a portion of the outer drum surface 432. The journal bearing contact portion 425 may be formed from a different material from the remainder of the drum 424. The journal bearing contact portion 425 may be integrally formed with the remainder of the drum or may be attached, formed on or adhered thereto. As will be discussed in more detail below, the journal bearing assemblies 460 each include a hydrostatic lifting arrangement 480 for selectively introducing a pressurized fluid between the journal bearing pads 464 and the drum surface 432. This fluid will typically be the same fluid as the working fluid passing through the fluid duct 430. Introduction of the pressurized fluid upon or just prior to initiation of rotation of the drum 432 serves to "lift" journal pads 464 away from the drum surface 432 and reduce the friction therebetween.

The thrust bearing assemblies 470 each comprise a plurality of thrust bearing pads 474 adapted to maintain bearing contact with a collar 434 formed on or attached to the outer drum surface 432 and extending radially outward therefrom. In the illustrated embodiment, two thrust bearing assemblies 470 are positioned on opposite surfaces 435, 436 of the collar 434 so that thrust reaction loads are provided in both the forward direction and the rearward direction. It will be understood by those of ordinary skill in the art that the drum 424 may incorporate additional collars 434. In such instances, additional thrust bearing assemblies 470 may be included. In some embodiments of the invention, a first thrust bearing assembly 470 may be positioned and adapted for bearing contact with a first collar 434 so as to provide forward thrust reaction and a second thrust bearing assembly 470 may be positioned and adapted for bearing contact with a second collar 434 so as to provide rearward thrust reaction. As will be discussed in more detail below, the thrust bearing assemblies 470 each include a hydrostatic lifting arrangement 490 for selectively introducing a pressurized fluid between the thrust bearing pads 474 and the drum surface 432. Again, this fluid will typically be the same fluid as the working fluid passing through the fluid duct 430. Introduction of the pressurized fluid upon or just prior to initiation of rotation of the drum 432 serves to "lift" the thrust pads 474 away from the collar 434 and reduce the friction therebetween.

Figure 11:
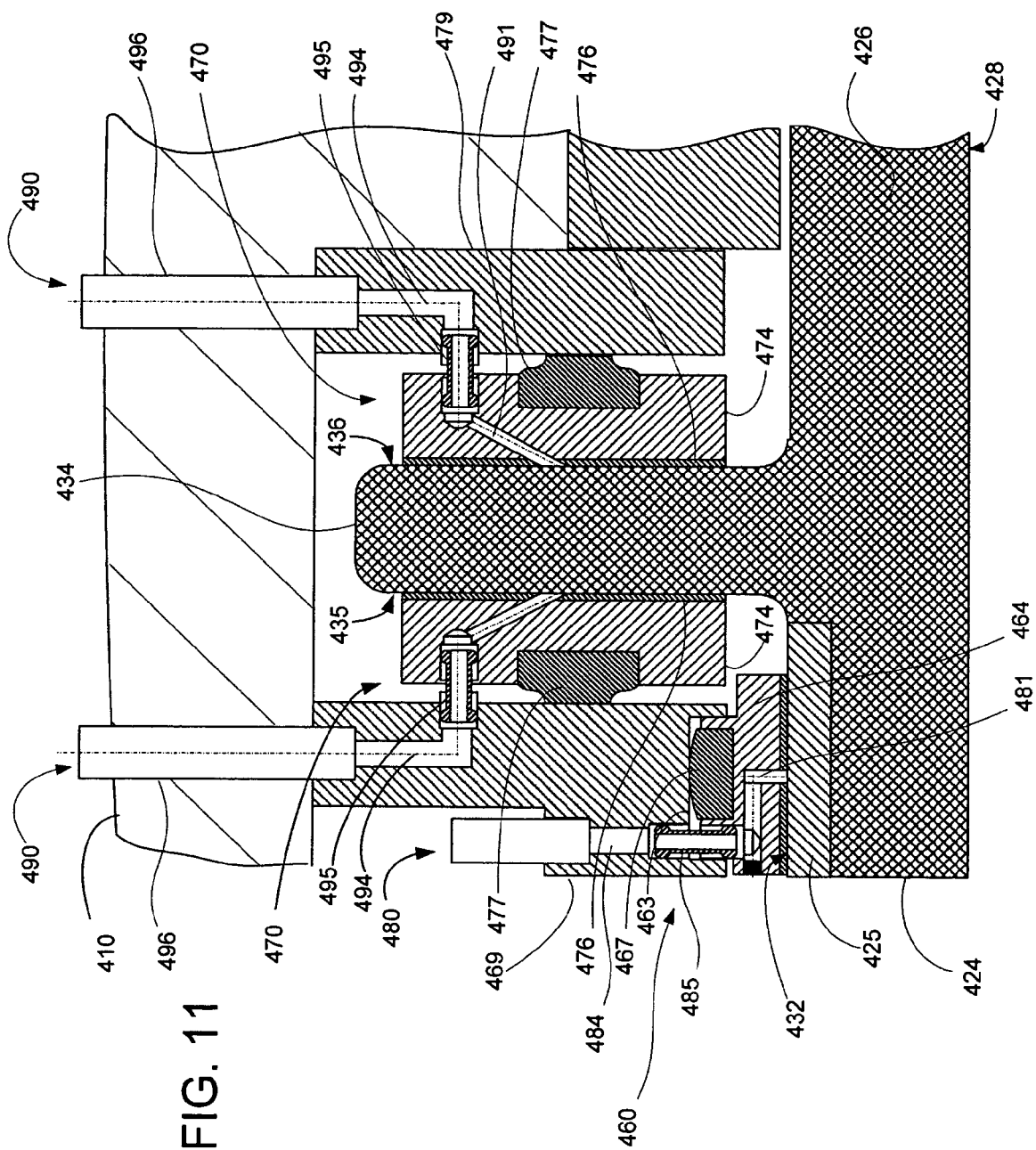
FIG. 11 is a section view of a portion of a propulsion pod system according to an embodiment of the invention.
Figure 12A:
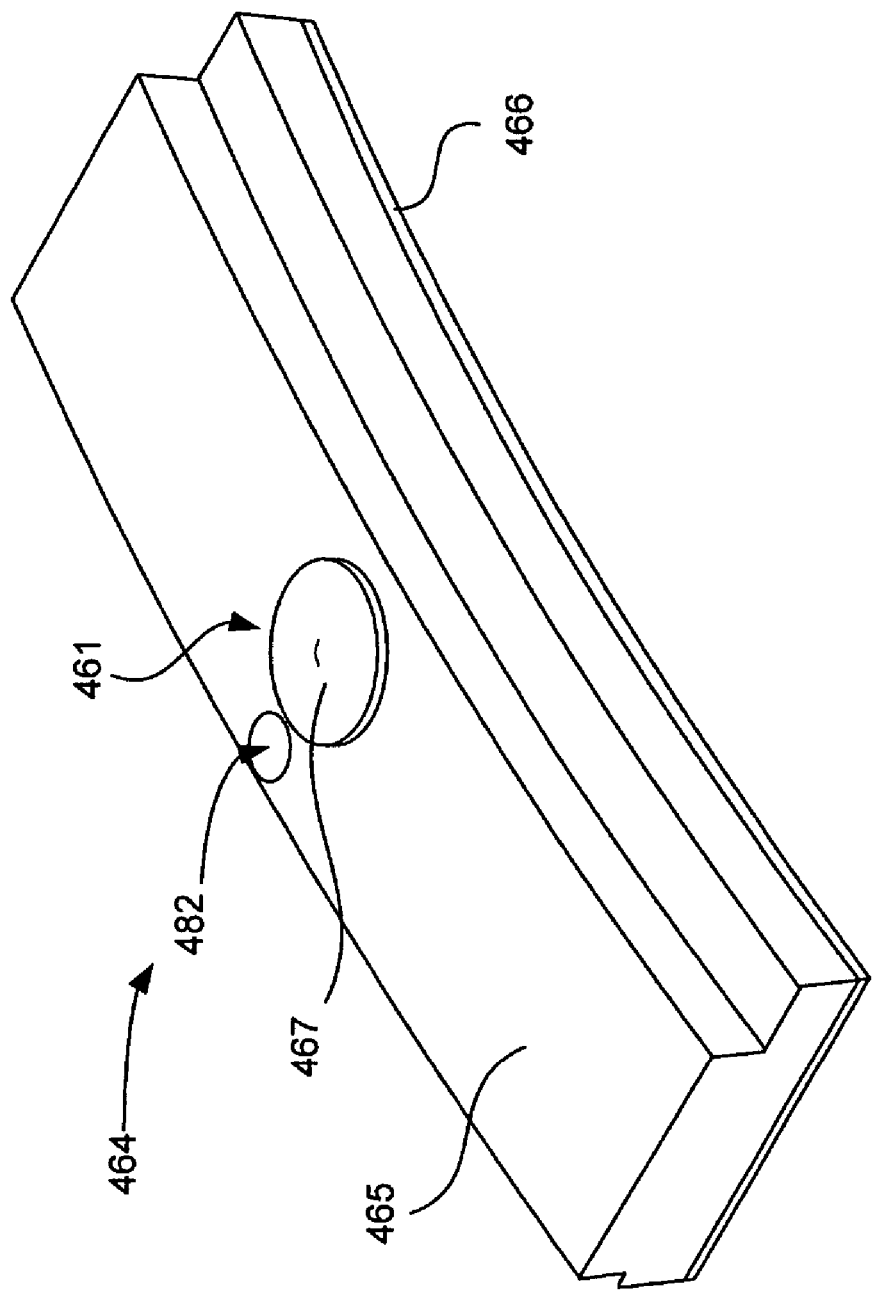
FIG. 12a is a perspective view of a bearing pad that may be used in embodiments of the invention.
Figure 12B:
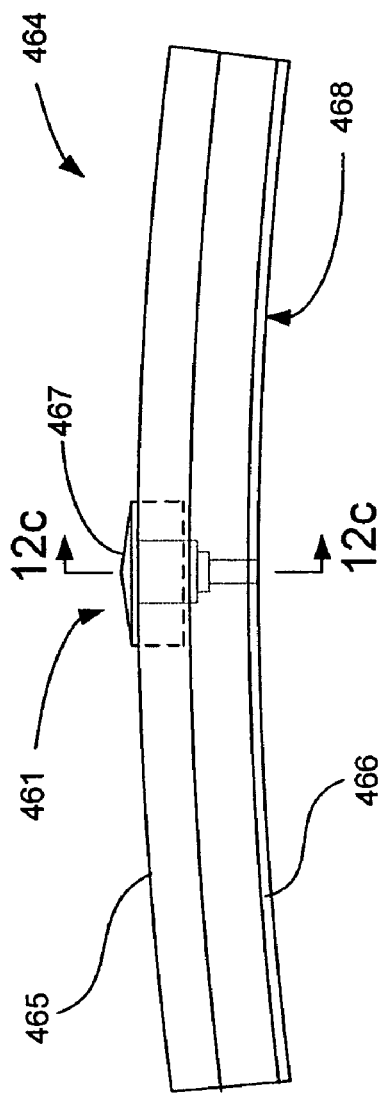
Figure 12C:
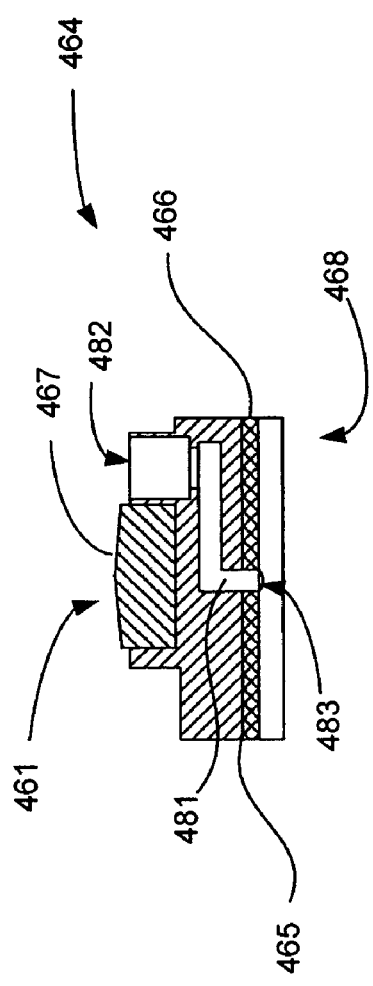
Figure 13B:
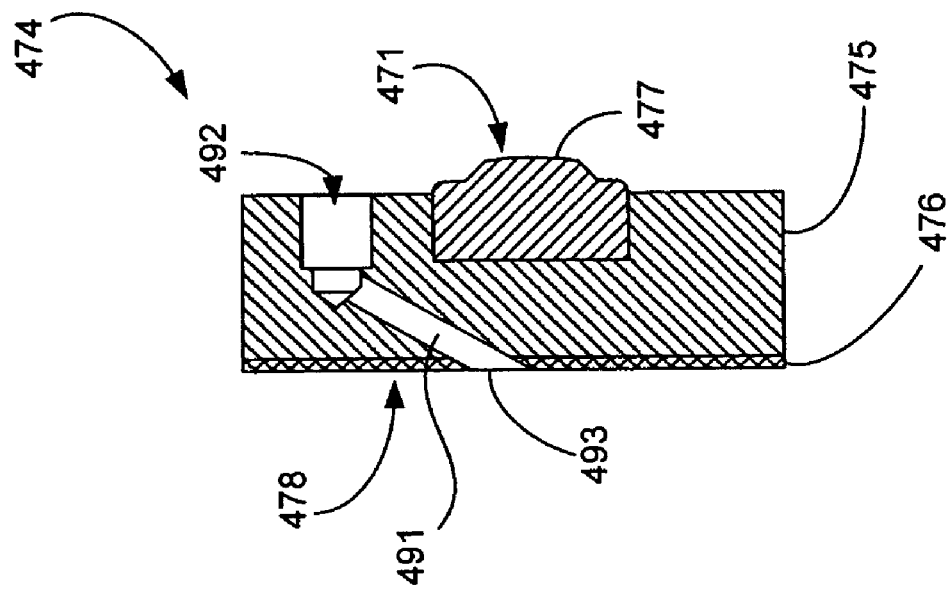
Figure 13A:
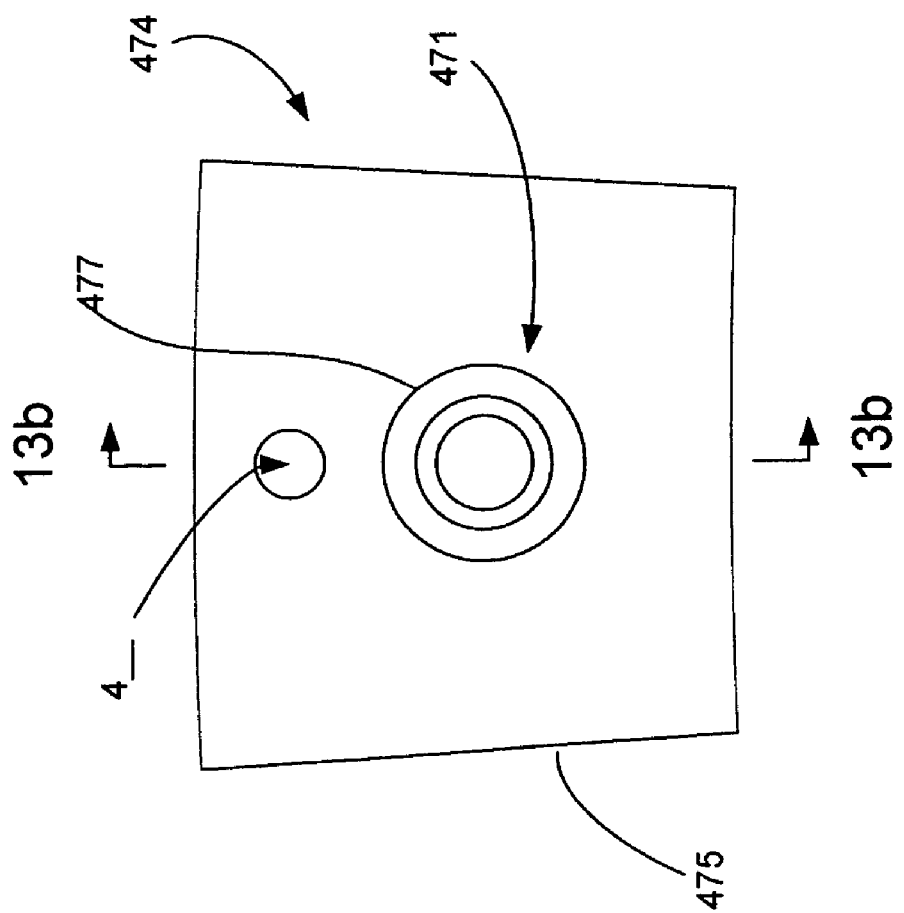
FIG. 13a is a plan view of a bearing pad that may be used in embodiments of the invention.

With reference to FIGS. 11-13, the bearing assemblies 460, 470 will now be discussed in more detail. As in the earlier embodiments, the journal bearing pads 464 may comprise a tilting pad block 465 having a bearing contact portion 466 with a curved bearing surface 468 that is shaped to conform to the drum surface 432. The bearing contact portion 466 may be integrally formed with journal bearing pad block 465 or may be a separate material deposited, attached or adhered to the pad block 465. The journal bearing pads 464 include a hydrostatic fluid duct 481 for passing a pressurized hydrostatic fluid from an entrance port 482 through the pad block 465 to an exit port 483 at the bearing surface 468.

The journal bearing pads may also comprise a pivot arrangement 461 that serves to provide a fulcrum for the tilting pad block 465 to rock or rotate about a pivot point or line. The pivot arrangement 461 is adapted to bear against a portion of the fixed support structure to allow the pad block 465 to rotate to maintain a desired bearing contact orientation with respect to the drum surface 432 when the drum surface changes its orientation relative to the structure supporting the pad block 465. In the illustrated embodiment, the fulcrum is provided by a button 467 partially inserted into the pad block 465. In some embodiments, the pivot arrangement 461 may comprise a fulcrum structure integrally formed with or machined into the pad block 465. The pivot arrangement 461 may comprise a point, line, spherical or other fulcrum arrangement known in the art to allow the adaptive orientation of the journal pad block 465. The pivot arrangement used in a given application may be determined based on the degree of change in drum surface orientation expected during operation.

The journal bearing pads 464 may be held in bearing contact with the drum surface 432 by a journal bearing retaining ring 469. The journal bearing ring 469 may have a retaining groove 463 configured for receiving the journal pad blocks 465. The groove 463 may be further adapted to provide a support surface for the pivot arrangement 461 and to allow for the rotational movement of the journal block pads 465 to adapt to changes in orientation of the drum surface 432. The journal bearing retaining ring 469 is configured to be retained in place by the fixed structure of the housing 410. The journal bearing retaining ring 469 may further comprise a through-passage 484 for each journal bearing pad 464. Each passage 484 is connected to the hydrodynamic fluid entrance port 482 of a respective journal bearing pad 464 by a fluid connector 485 that allows for passage of a hydrostatic fluid into and through the hydrostatic fluid duct 481 to be ejected through the exit port 483. The fluid connector 485 is configured so that it maintains a pressurized connection regardless of orientation changes of the tilting journal pad block 464. The fluid passages 484 through the journal bearing retaining ring 469 are adapted for connection to a plurality of hydrostatic fluid lines 485 that may be passed through the housing wall 410 in any suitable manner.

It will be understood that each journal bearing assembly 460 may comprise any number of journal pad blocks 465 around the circumference of the drum 424. For a given pad surface area, the size and number of the journal pad blocks 465 may be determined by the expected degree of misalignment of the rotation axis or change in orientation of the drum surface 432 during operation.

The thrust bearing pads 474 may comprise a tilting pad block 475 similar to that of the previous embodiments. The thrust pad block 475 may have a bearing contact portion 476 with a bearing surface 478 that is shaped to conform to the surfaces 435, 436 of the collar 434. The bearing contact portion 476 of the thrust bearing pad block 475 may be integrally formed with the thrust bearing pad block 475 or may be a separate material deposited, attached or adhered to the pad block 475. The thrust bearing pads 474 include a hydrostatic fluid duct 491 for passing a pressurized hydrostatic fluid from an entrance port 492 through the pad block 475 to an exit port 493 at the bearing surface 478.

The thrust bearing pads 474 may also comprise a pivot arrangement 471 that serves to provide a fulcrum for the tilting pad block 475. As with the journal bearing pivot arrangement 461, the thrust bearing pivot arrangement 471 is adapted to bear against a portion of the fixed support structure to allow the thrust bearing pad block 475 to rotate to maintain a desired bearing contact orientation with respect to the collar surfaces 435, 436 when the collar changes its orientation relative to the structure supporting the pad block 475. In the illustrated embodiment, the fulcrum is provided by a button 477 partially inserted into the pad block 475. In some embodiments, the pivot arrangement 471 may comprise a fulcrum structure integrally formed with or machined into the pad block 475. The pivot arrangement 471 may comprise a point, line, spherical or other fulcrum arrangement known in the art to allow the adaptive orientation of the journal pad block 475. The pivot arrangement used in a given application may be determined based on the degree of change in collar surface orientation expected during operation.

The thrust bearing pads 474 may be held in bearing contact with the collar 434 by a pair of thrust bearing retaining rings 479, one for the forward thrust bearing pads 474 and one for the rearward thrust bearing pads 474. The thrust bearing rings 479 are adapted to provide a support surface for the pivot arrangement 471 and to allow for the rotational movement of the journal block pads 475 to adapt to change in orientation of the collar 434. The thrust bearing retaining rings 479 are configured to be retained in place by the fixed structure of the housing 410. The thrust bearing retaining ring 479 may further comprise a through-passage 494 for each thrust bearing pad 474. Each passage 494 is connected to the hydrostatic fluid entrance port 492 of a respective thrust bearing pad 474 by a fluid connector 495 that allows for passage of a hydrostatic fluid into and through the hydrostatic fluid duct 491 to be ejected through the exit port 493. The fluid connector 495 is configured so that it maintains a pressurized connection regardless of orientation changes of the tilting thrust pad block 474. The fluid passages 494 through the thrust bearing retaining ring 479 are adapted for connection to a plurality of hydrostatic fluid lines 496 that may be passed through the housing wall 412 in any suitable manner.

It will be understood that each thrust bearing assembly 470 may comprise any number of thrust pad blocks 475 around the circumference of the drum 424. The size and number of the thrust pad blocks 475 may be determined by, among other things, the expected degree of misalignment of the rotation axis or change in orientation of the collar 434 during operation.

As in the non-hydrodynamic systems described above, a combination of rim-mounted tilting pad and rim-mounted conventional pad bearing assemblies may be used. It will also be understood that propulsions systems according to the invention may have some hydrostatic bearings and some non-hydrostatic bearings. For example, a propulsion system similar to that of the system 400 of FIG. 10 may comprise hydrostatic journal bearings and non-hydrostatic thrust bearings or vice versa.

It will be understood by those of ordinary skill in the art that the present invention is not limited to pod propulsion systems, but instead may be applied to virtually any form of shrouded rotor system. It may be applied to both shaft-driven and rim-driven rotor systems. It may also be applied to turbine systems wherein the rotor is driven by the working fluid.

While the foregoing description includes details and specificities, it is to be understood that these have been included for purposes of explanation only, and are not to be interpreted as limitations of the present invention. Modifications to the embodiments described above can be made without departing from the spirit and scope of the invention, which is intended to be encompassed by the following claims and their legal equivalents.

What is claimed is:

1. A pod propulsion system comprising:
    a housing defining a fluid duct;
    an annular drum rotatably mounted to the housing within the fluid duct, the annular drum having a drum interior and a cylindrical outer surface;
    a rotor mounted to the drum for rotation therewith, the rotor and the drum having a common axis of rotation for impelling a working fluid through the fluid duct, thereby imparting a propulsion force to the drum;
    a bearing assembly mounted to the housing, the bearing assembly comprising a first bearing comprising a first plurality of bearing pads disposed circumferentially around the drum, each pad having a pad bearing surface adapted to contact a first drum portion in a predetermined manner and being pivotably mounted to the housing so as to maintain contact of the pad bearing surface with the first drum portion in the predetermined manner when an orientation of the drum portion relative to the housing changes, the bearing assembly being adapted to transmit the propulsion force to the housing,
    wherein the first bearing is adapted and positioned to provide a radial reaction component to the drum in a direction perpendicular to the axis of rotation,
    wherein the propulsion force has a thrust component in a direction parallel to the axis of rotation and the bearing assembly comprises a second bearing comprising a second plurality of bearing pads disposed circumferentially around the drum, each pad having a pad bearing surface adapted to contact a second drum portion in a predetermined manner, the second bearing being adapted and positioned to provide a thrust reaction component to the drum in a direction parallel to the axis of rotation, and
    wherein the drum comprises a circumferential collar extending radially outward from the outer cylindrical surface and the second bearing comprises a thrust bearing ring to which the second plurality of bearing pads is mounted, the thrust bearing ring being positioned around the drum adjacent the collar so that the second plurality of bearing pads maintains bearing contact with the collar for transmission of the thrust reaction component thereto.

2. A pod propulsion system according to claim 1 wherein the first bearing comprises a journal bearing ring to which a first plurality of bearing pads is mounted, the journal bearing ring being positioned around the drum so that the first plurality of bearing pads maintains bearing contact with the cylindrical outer surface of the drum for transmission of the radial reaction component thereto.

3. A pod propulsion system according to claim 1 wherein each of the second plurality of bearing pads is pivotably mounted to the thrust bearing ring so as to maintain contact of the pad bearing surface with the second drum portion in the predetermined manner when an orientation of the second drum portion relative to the housing changes.

4. A pod propulsion system according to claim 1 further comprising:
a hydrostatic lifting arrangement adapted to selectively introduce a pressurized fluid intermediate the pad bearing surface and the first drum portion, the hydrostatic lifting arrangement including
a pad fluid duct formed through at least one of the bearing pads, the pad fluid duct comprising an exit port at the pad bearing surface;
means for supplying pressurized fluid to the pad fluid duct.

5. A pod propulsion system according to claim 1 further comprising:
means for selectively introducing a pressurized fluid intermediate the first drum portion and the pad bearing surface of at least one of the first plurality of bearing pads, thereby reducing the friction between the first drum portion and the pad bearing surface.

6. A pod propulsion system according to claim 5 wherein the means for selectively introducing a pressurized fluid comprises:
a pad fluid duct formed through the at least one of the first plurality of bearing pads, the pad fluid duct having an exit port at the pad bearing surface of the at least one of the first plurality of bearing pads;
means for supplying pressurized fluid to the pad fluid duct.

7. A bearing arrangement for supporting a rotor unit comprising an annular cylindrical drum and a rotor disposed within the drum, the rotor unit having an axis of rotation and being rotatably mounted within a fluid duct defined by a fixed housing, the rotor being adapted for impelling a working fluid through the fluid duct to impart a propulsion force to the drum, the bearing arrangement comprising:
a first bearing comprising a first plurality of bearing pads disposable circumferentially around the drum, each pad having a first bearing surface adapted to contact a first drum portion in a predetermined manner and being pivotably mountable to the housing so as to maintain contact of the bearing surface with the first drum portion in the predetermined manner when an orientation of the first drum portion relative to the housing changes
wherein the first bearing is adapted to transmit a thrust component of the propulsion force to the housing and to provide a thrust reaction component to the drum in a direction parallel to the axis of rotation; and
a second bearing comprising a second plurality of bearing pads disposable circumferentially around the drum, each pad having a second pad bearing surface adapted to contact a second drum portion in a predetermined manner,
wherein the second bearing is adapted and positioned to provide a radial reaction component to the drum in a direction perpendicular to the axis of rotation, and
wherein the first bearing comprises a thrust bearing ring to which the first plurality of bearing pads is mounted, the thrust bearing ring being positionable around the drum so that the first plurality of bearing pads maintains bearing contact with a circumferential collar extending radially outward from the drum.

8. A bearing arrangement according to claim 7 wherein each of the second plurality of bearing pads is pivotably mountable to the housing so as to maintain contact of the second pad bearing surface with the second drum portion in the predetermined manner when an orientation of the drum portion relative to the housing changes.

9. A bearing arrangement according to claim 7 wherein the second bearing comprises a journal bearing ring to which the second plurality of bearing pads is mounted, the journal bearing ring being positionable around the drum so that the second plurality of bearing pads maintains bearing contact with the second drum portion for transmission of the radial reaction component thereto.

10. A bearing arrangement according to claim 7 further comprising:
a hydrostatic lifting arrangement adapted to selectively introduce a pressurized fluid intermediate the first pad bearing surface and the first drum portion, the hydrostatic lifting arrangement including
a pad fluid duct formed through at least one of the first plurality of bearing pads, the pad fluid duct comprising an exit port at the pad bearing surface;
means for supplying pressurized fluid to the pad fluid duct.

11. A bearing arrangement according to claim 7 further comprising:
means for selectively introducing a pressurized fluid intermediate the first drum portion and the first pad bearing surface of at least one of the first plurality of bearing pads, thereby reducing the friction between the first drum portion and the pad bearing surface.

12. A bearing arrangement according to claim 11 wherein the means for selectively introducing a pressurized fluid comprises:
a pad fluid duct formed through the at least one of the first plurality of bearing pads, the pad fluid duct comprising an exit port at the first pad bearing surface of the at least one of the first plurality of bearing pads;
means for supplying pressurized fluid to the pad fluid duct.

* * * * *